March 12, 1940.                J. B. DYER                 2,193,247
                           DOMESTIC APPLIANCE
                        Filed Aug. 20, 1937         6 Sheets-Sheet 1
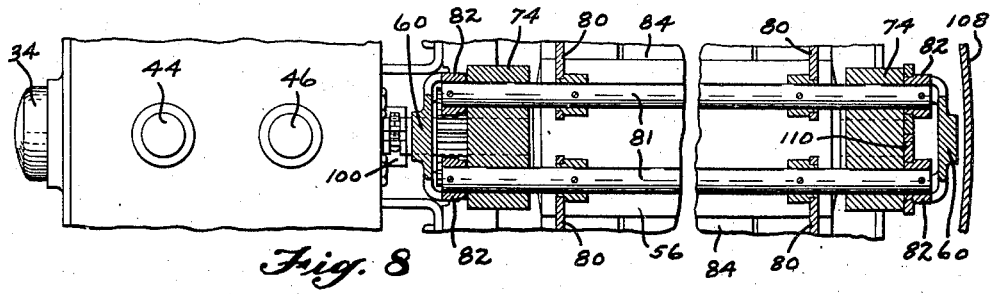
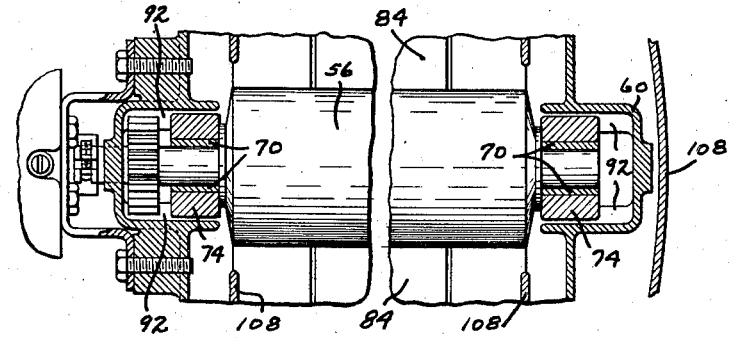
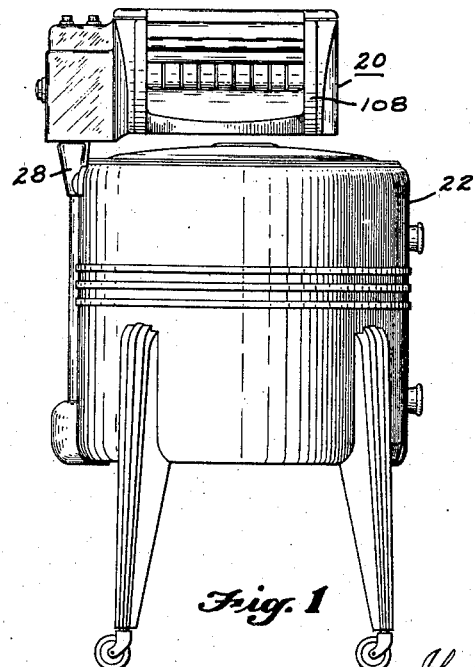
INVENTOR.
John B. Dyer
BY Spencer, Hardman & Fehr
ATTORNEYS March 12, 1940. J. B. DYER 2,193,247
DOMESTIC APPLIANCE
Filed Aug. 20, 1937 6 Sheets-Sheet 5

INVENTOR.
John B. Dyer
BY Spencer, Hardman & Fehr
ATTORNEY.

March 12, 1940.  J. B. DYER  2,193,247
DOMESTIC APPLIANCE
Filed Aug. 20, 1937  6 Sheets-Sheet 6

John B. Dyer  INVENTOR.
BY Spencer, Hardman & Fehr
ATTORNEYS.

Patented Mar. 12, 1940

2,193,247

UNITED STATES PATENT OFFICE 2,193,247

DOMESTIC APPLIANCE

John B. Dyer, Dayton, Ohio, assignor to General Motors Corporation, Dayton, Ohio, a corporation of Delaware Application August 20, 1937, Serial No. 160,151

3 Claims. (Cl. 68—253)

This invention relates to laundry apparatus and more particularly to wringer structure.

Many wringers have been designed which have incorporated so-called safety release mechanisms, but most of the prior art devices are either difficult to trip, difficult to reassemble after having been tripped, or are dangerous in operation in that tripping of the release mechanism sets into motion some arm or the like which flies out with considerable force, often times resulting in serious injury to the operator. Applicant's wringer mechanism is designed to overcome these various difficulties and is further designed so as to minimize the necessity of anyone having to release the trip mechanism.

An object of the invention is to provide a conveniently located safety release which may be operated by a push in any direction.

Still another object of this invention is to provide a wringer mechanism having improved means for conveying the clothes up to the wringer rolls.

Still another object of this invention is to provide a new and improved drainage system for the water leaving the clothes.

A further object of this invention is to provide a wringer mechanism in which the rolls cease operating after the safety release has been tripped.

Still another object of this invention is to provide a new and improved mounting and tensioning means for the wringer rolls.

A still further object of this invention is to provide a feed apron which is made up of a plurality of independent endless belts.

Further objects and advantages of the present invention will be apparent from the following description, reference being had to the accompanying drawings, wherein a preferred form of the present invention is clearly shown.

In the drawings:

Fig. 1 is an elevational view of my wringer shown attached to a washing machine;

Fig. 8 is a fragmentary horizontal sectional view taken on line 8—8 of Fig. 3;

Fig. 9 is a fragmentary horizontal sectional view taken on line 9—9 of Fig. 3;

Figure 2:
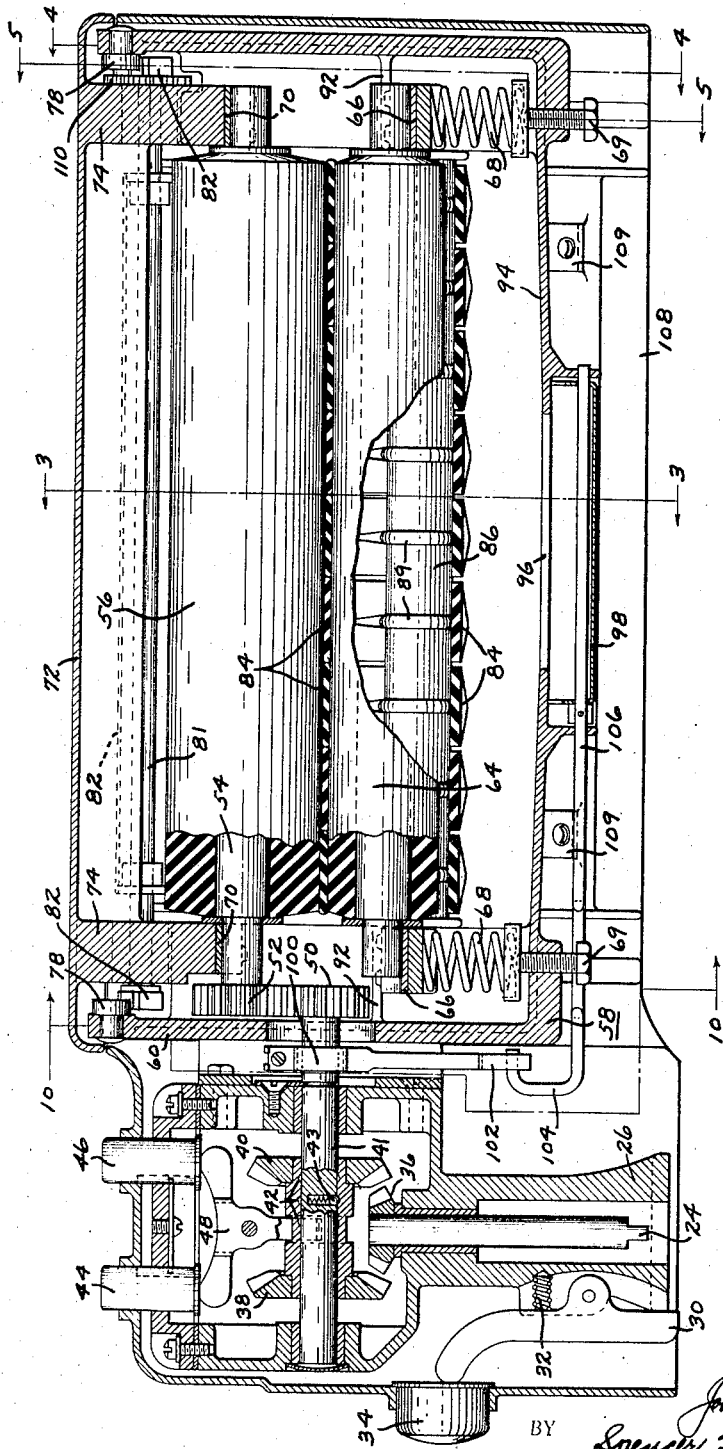
Fig. 2 is a vertical cross-sectional view taken on line 2—2 of Fig. 3 showing parts of the rolls broken away.

Referring now to the drawings, Fig. 1 shows my wringer generally designated by the reference character 20 attached to a washing machine 22. As best shown in Fig. 2, the wringer is provided with a main drive shaft 24 journaled within a main frame 26 which is adapted to be mounted on the unsual form of wringer supporting post 28. A setting pawl 30 is provided for holding the wringer in any one of a plurality of positions in the usual manner. The pawl 30 engages with the usual form of notches (not shown) provided on the mounting post 28. A spring 32 holds the pawl 30 in engagement with one or the other of the notches. Button 34 is provided for releasing the pawl.

The drive shaft 24 is provided with the usual form of a pinion gear 36 which is adapted to mesh with either of the bevel gears 38 or 40 which are mounted to slide together on the shaft 41 in the usual manner. Detents 42 cooperate with the spring pressed pawl 43 to releasably hold the gears 38 and 40 against longitudinal movement on the shaft. The usual form of key and keyways (not shown) prevent relative rotation between the shaft 41 and the gears 38 and 40.

In order to start and stop the wringer I have provided a pair of push buttons 44 and 46 which cooperate with the shifting arms 48 for shifting the gears 38 and 40 relative to the shaft 41. A push on the button 44, for example, will shift the gear 38 into engagement with the pinion 36 with the result that the wringer rolls will rotate in the one direction; whereas, a push button on the button 46 will move the gear 38 out of engagement with the pinion 36. And, if the button 46 is pushed in far enough, the gear 40 will engage with the pinion 36 so as to operate the wringer rolls in the reverse direction. The shaft 41 carries a gear wheel 50 which meshes with a gear wheel 52 carried directly by the shaft 54 of the upper wringer roll 56. Rotation of the shaft 41, therefore, causes rotation of the wringer roll 56.

Figure 7:
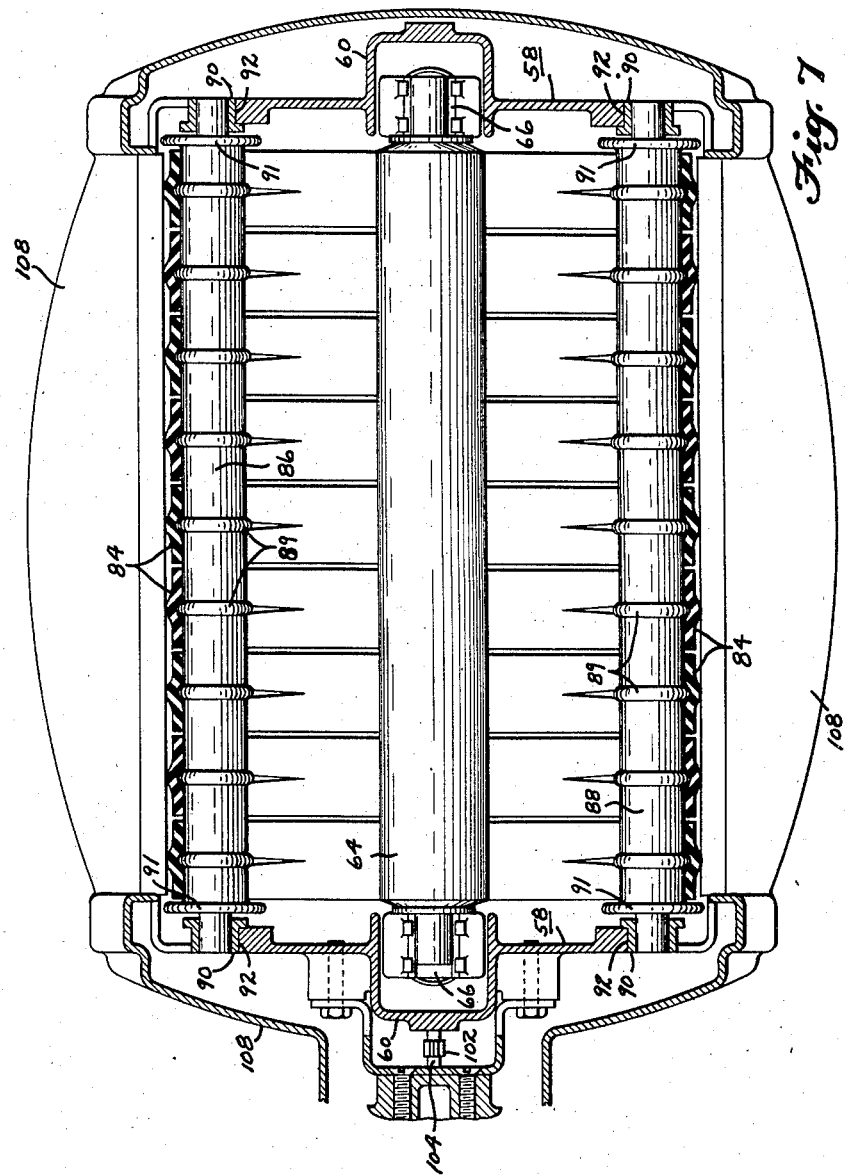
Fig. 7 is a horizontal sectional view taken on line 7—7 of Fig. 3.

A main frame 58 supports the wringer mechanism. Referring to Fig. 2, it will be noted that the main frame 58 is in the form of a U having upstanding arms 60. Referring to Fig. 7, it will be observed that the arms 60 are provided with channels or guideways in which the wringer roll bearings 66 and 70 are slidably supported. The lower roll 64 is supported on the bearing elements 66 which are biased upwardly by means of springs 68. Set screws 69 are provided for adjusting the amount of tension placed on the roll. The upper roll 56 is normally held in engagement with the lower roll by means of open-sided bearing elements 70 carried by the upper frame member 72 which spans the arms 60 of the main U-shaped frame 58.

The upper frame member 72 is provided with a pair of depending legs 74 which carry the bearing members 70 and which extend into the channels of the arms 60. The spring members 68 normally tend to shove the roll 64 against the roll 56 which is held from moving upwardly by the legs 74 of the frame 72 as will be explained hereinafter.

Figure 3:
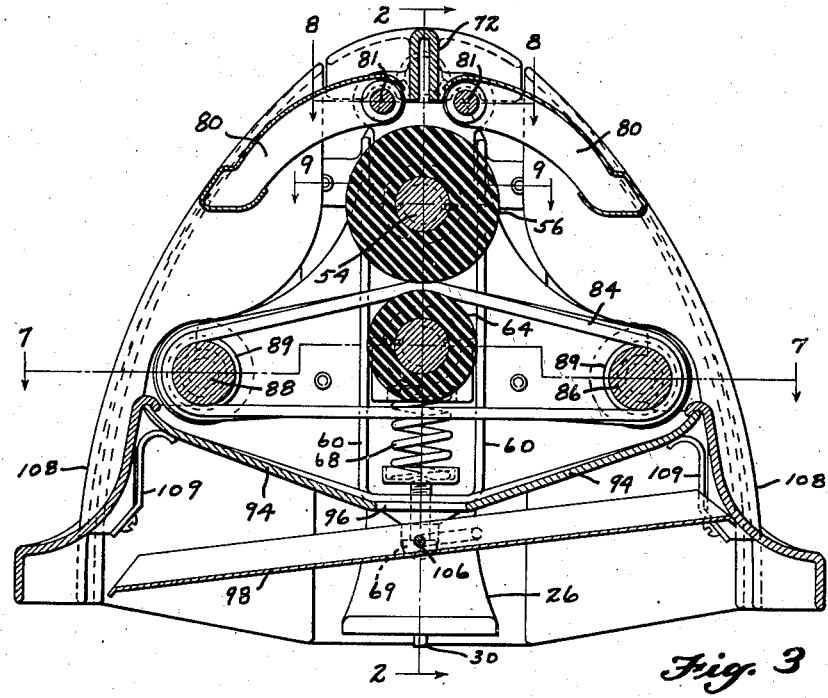
Fig. 3 is a vertical cross-sectional view taken on line 3—3 of Fig. 2.

Referring to Figs. 2 and 3, it will be observed that a plurality of endless belts 84 pass between the rolls 56 and 64. Two small guide rolls or pulleys 86 and 88 are provided, one on each side of the wringer rolls. The belts pass over these guide rolls and between the wringer rolls and are driven by the friction between the wringer rolls and the belt. The guide rolls 86 and 88 are provided with a plurality of beads 89 which serve to guide the belts. A flange 91 is provided at each end of each guide roll. The guide rolls 86 and 88 are provided with bearings 90 which are supported in open-sided slots 92 provided on the main frame 58. With this arrangement it is a very simple job to replace a belt in the event of breakage.

While I have shown a plurality of individual belts, a single belt could be used. However, it has been found that there are several advantages in providing a plurality of individual belts. In the first place, the problem of guiding a single belt is more difficult than the problem of guiding a plurality of smaller belts. By virtue of the beads 89, the individual belts stay in alignment and each belt tends to directly straddle a bead. By providing a plurality of belts, the drainage of water is also facilitated, since the water is permitted to drain down between the individual belt segments; whereas, where a single wide belt is used, the water does not drain as freely. Another advantage of providing a plurality of belts is that, in the event a metallic buckle or the like should pass through the wringer and puncture or break a belt, the replacement cost is less.

While I have shown belts made of rubber, it is obvious that other materials, such as canvas, might be used. However, there are several advantages in using rubber or rubber-like material. In the first place, the tendency for slipping is not as great, and the rubber gives more easily with the result that the beads 89 more effectively guide the belts. The rubber belts, furthermore, stretch more easily with the result that the lower roll is free to move up and down without undue resistance from the belt members.

The main frame 58 is provided with a drainage baffle 94 which extends from one guide roll to the other guide roll and which is provided with a drain opening 96 which discharges the water onto a drain board 98 secured to rod 106 which is mounted beneath the wringer structure.

Figure 10:
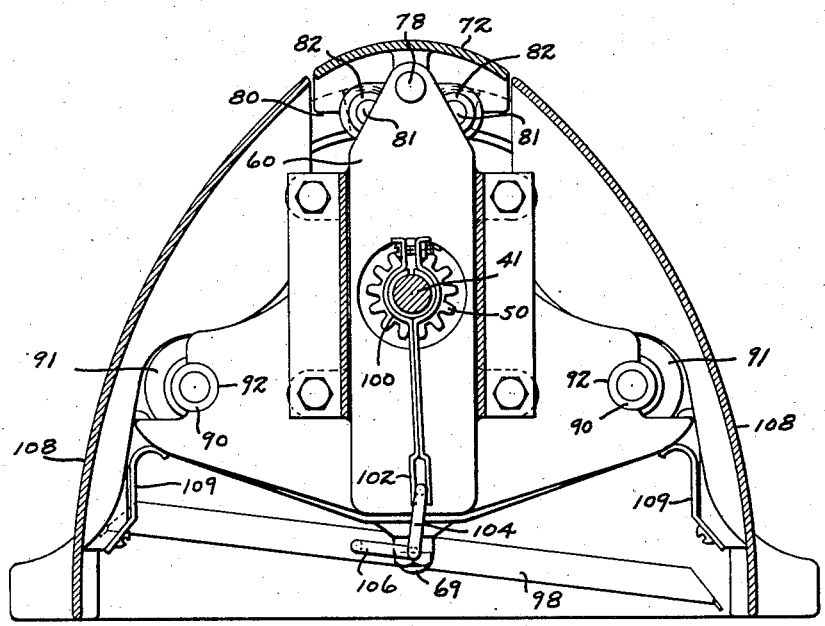
Fig. 10 is a vertical sectional view taken on line 10—10 of Fig. 2.

Referring to Fig. 10 it will be observed that a clutch 100 frictionally engages the drive shaft 41. The lower end of the clutch is provided with a bifurcated arm 102 which engages crank member 104 carried by the shaft 106. By virtue of this arrangement rotation of the shaft 41 will tend to hold the drain board 98 in one position or the other depending upon the direction of rotation of the shaft 41. In order to fully enclose the gears, etc., a hood member 108 is slipped over the frame structure and is held in place by means of clamps 109 which engage underneath the frame 58.

A safety release means is provided for holding the roll 56 in place. This safety release means comprises a pair of stop members 78 carried at the upper ends of the arms 60 and a pair of trigger members 80 which are pivotally mounted on the legs 74 and which carry dogs 82 which normally engage the stops 78.

Figure 4:
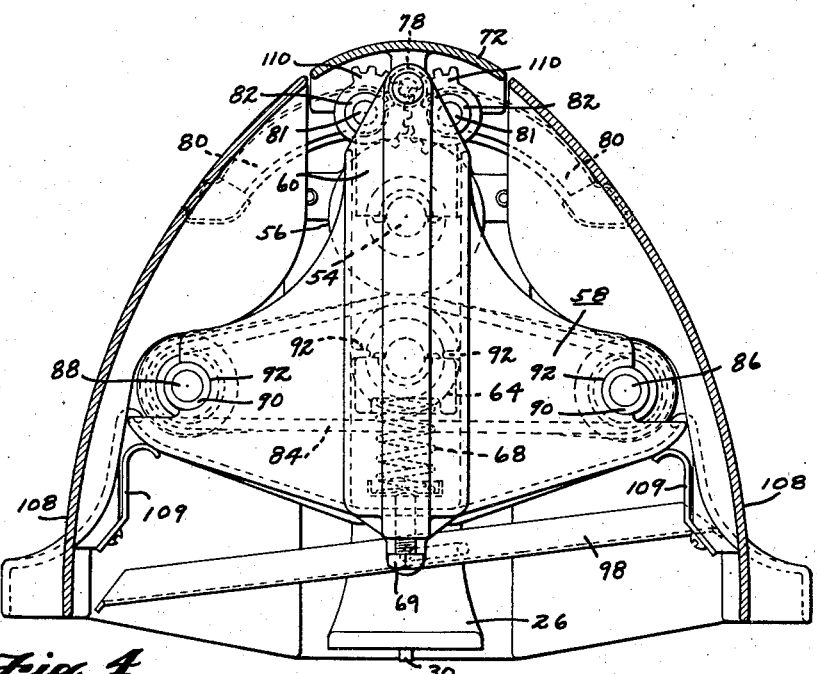
Fig. 4 is a vertical cross-sectional view taken on line 4—4 of Fig. 2.
Figure 5:
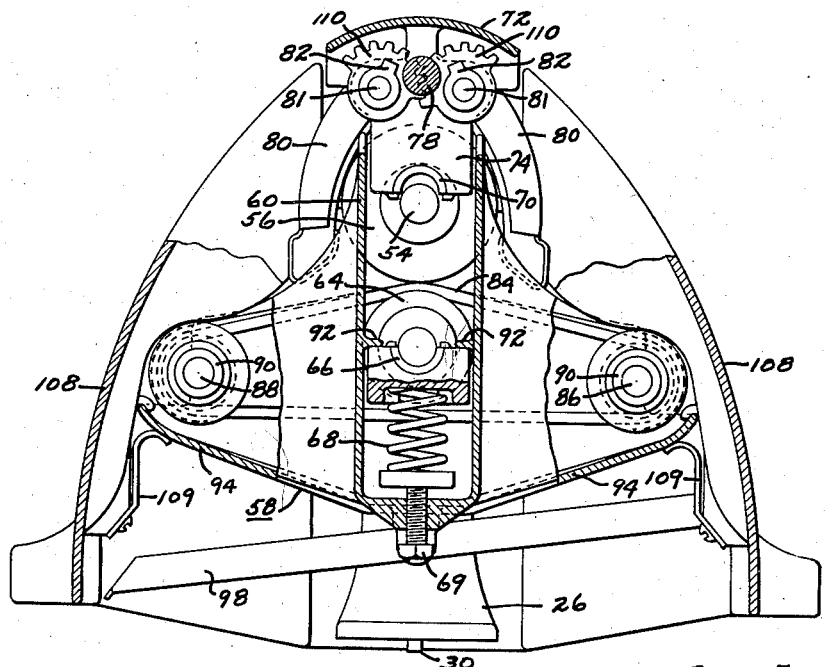
Fig. 5 is a vertical cross-sectional view taken on line 5—5 of Fig. 2 showing the arrangement of parts after the safety release has been pushed downwardly.
Figure 6:
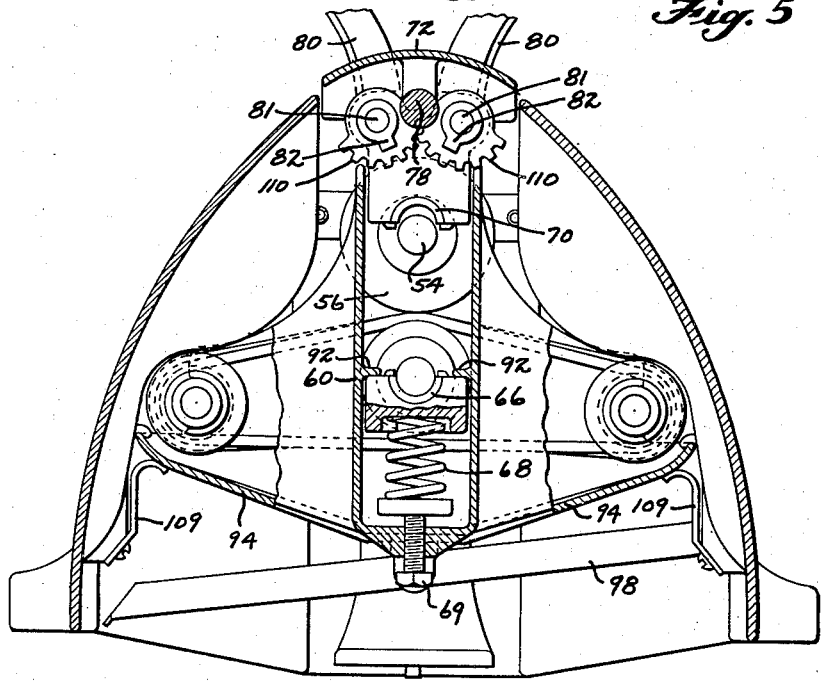
Fig. 6 is a vertical cross-sectional view taken on line 5—5 of Fig. 2 showing the arrangement of parts after the safety release has been pushed upwardly.

Referring now to Figs. 4, 5, and 6, it will be noted that the release bars or triggers 80 are carried by shafts 81 journaled in the leg members 74 of the upper frame 72. In the position shown in Fig. 4 the dogs 82 abut against the stop members 78 which are carried by the arms 60 of the lower frame. With this arrangement the upper frame 72 which positions the bearings 70 for the upper roll 56 is held in place with the result that the upper roll 56 is in operative engagement with the lower roll. In this position the gear 52 carried by the shaft 54 of the upper roll is in mesh with the gear 50 carried by the drive shaft 41. As the clothes pass through the wringer the upper roll rotates but is not permitted to reciprocate within the frame. The lower roll, however, which is biased into engagement with the upper roll by means of the springs 68 is permitted to reciprocate within the frame so as to accommodate the clothes passing through the wringer.

As best shown in Figs. 5 and 6, the bearing members 66 for the lower roll 64 are slidably supported within the channels of the arms 60 and are prevented from moving upwardly too far by means of stops 92 integral with the arms 60. In the event that it becomes necessary or desirable to stop the wringer operation and release the spring pressure, all that is necessary is to give the trigger 80 a push so as to disengage the dogs 82 from the stops 78. Immediately upon disengagement of the dogs 82 from the stops 78, the upper roll is free to move upwardly with the result that the pressure is completely relieved and the gear 52 moves out of engagement with the gear 50 and this, in turn, stops rotation of the rolls.

Figure 11:
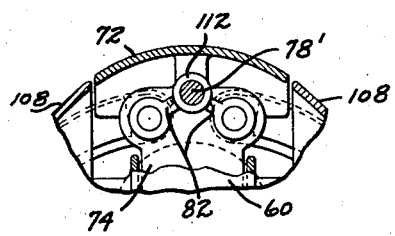
Fig. 11 is a fragmentary sectional view showing modified safety release mechanism.

The safety release mechanism, as explained hereinabove, consists of the two trigger members 80 adapted to be pivotally mounted on opposite sides of the wringer head so that the release mechanism may be tripped from either side. As shown in Figs. 4, 5, and 6 gear sectors 110 are provided on each shaft and rotate with the trigger mechanism so that as one trigger moves the other trigger will move also. As shown in Fig. 11 the gear sectors 110 may be omitted, in which case the stop 78', corresponding to the stop 78 in the other modification, is provided with a roll 112 which freely rotates on the stop 78'. The roll 70 reduces the resistance to movement of the dogs and also imparts movement from the one trigger to the other trigger by virtue of the frictional engagement between the dogs and the roll 112. With either of the above described arrangements the trip pressure is substantially independent of wringer squeeze pressure.

The upper frame 72 may be lifted out of place and carries with it the safety release mechanism. With the upper frame 72 removed, the roll 56 may also be lifted out of place. Upon removal of the roll 56 it is very easy to remove the guide rolls 88 from the sockets 92 and, with this being done, the endless belt mechanism and the lower roll are also free to be lifted out of place.

As explained hereinabove, I have provided a conveniently located and easily operated safety release mechanism which not only releases the pressure on the wringer rolls but also causes the driving gears to disengage. Furthermore, my improved wringer construction greatly minimizes the danger of getting foreign objects caught between the rolls.

While the form of embodiment of the invention as herein disclosed, constitutes a preferred form, it is to be understood that other forms might be adopted, all coming within the scope of the claims which follow.

What is claimed is as follows:

1. In a wringer, a pair of rolls, means for feeding clothes between said rolls comprising endless belt means of resilient material passing between said rolls and encircling one of said rolls, means for applying squeeze pressure to said rolls, means for driving one of said rolls, safety trip mechanism, and means operated thereby for releasing the squeeze pressure and disengaging said driving means, said safety trip mechanism comprising guards disposed above said endless belt means and being substantially coextensive with the upper surface of said belt means.

2. In a wringer, a pair of rolls, means for feeding clothes between said rolls comprising endless belt means of resilient material passing between said rolls and encircling one of said rolls, means for applying squeeze pressure to said rolls, means for driving one of said rolls, safety trip mechanism, and means operated thereby for releasing the squeeze pressure and disengaging said driving means, said safety trip mechanism comprising a pair of guard elements mounted on opposite sides of said rolls and having cooperating mechanism whereby movement of one of said elements imparts movement to the other of said elements.

3. In a wringer, a frame member, a pair of rolls, a first bearing for one of said rolls, bearing means for the other of said rolls, means whereby said rolls are spring pressed into engagement, means for normally holding said first bearing in a fixed position comprising in combination, a stop member carried by said frame, a pair of arms pivotally carried by said normally fixed bearing member and normally engaging said stop member to hold said bearing in place, means for moving one of said arms out of engagement with said stop, and means whereby movement of either one of said arms imparts movement to the other of said arms.

JOHN B. DYER.